(12) United States Patent
Thalhauser et al.

(10) Patent No.: US 10,941,712 B2
(45) Date of Patent: Mar. 9, 2021

(54) INTERNAL COMBUSTION ENGINE WITH A REGULATING DEVICE

(71) Applicant: INNIO Jenbacher GmbH & Co OG, Jenbach (AT)

(72) Inventors: Josef Thalhauser, Nuborf (DE); Nikolaus Spyra, Innsbruck (DE); Ettore Musu, Garching b. Munich (DE)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 255 days.

(21) Appl. No.: 15/738,003

(22) PCT Filed: Jun. 28, 2016

(86) PCT No.: PCT/AT2016/050236
§ 371 (c)(1),
(2) Date: Aug. 24, 2018

(87) PCT Pub. No.: WO2017/000012
PCT Pub. Date: Jan. 5, 2017

(65) Prior Publication Data
US 2018/0355805 A1    Dec. 13, 2018

(30) Foreign Application Priority Data
Jun. 30, 2015   (AT) .................................. A 417/2015

(51) Int. Cl.
*F02D 13/02*     (2006.01)
*F02D 41/00*     (2006.01)

(52) U.S. Cl.
CPC ..... *F02D 13/0269* (2013.01); *F02D 13/0203* (2013.01); *F02D 13/0223* (2013.01);
(Continued)

(58) Field of Classification Search
CPC .............. F02D 41/005; F02D 13/0269; F02D 13/0203; F02D 13/0223; F02D 2250/36;
(Continued)

(56) References Cited

U.S. PATENT DOCUMENTS

| 3,942,499 A | 3/1976 | Kunik et al. |
| 4,867,127 A * | 9/1989 | Quirchmayr ............ F02B 63/04 123/527 |

(Continued)

FOREIGN PATENT DOCUMENTS

| AT | 515499 B1 | 1/2016 |
| AT | 516134 A2 | 2/2016 |

(Continued)

OTHER PUBLICATIONS

Office Action and Search issued in connection with corresponding AT Application No. A417/2015 dated Jun. 24, 2016.
(Continued)

*Primary Examiner* — Patrick Hamo
*Assistant Examiner* — Wesley G Harris
(74) *Attorney, Agent, or Firm* — Fletcher Yoder, P.C.

(57) ABSTRACT

An internal combustion engine with a regulating device, whereby a fuel-air mixture is burned in the internal combustion engine with a combustion air ratio controllable by the regulating device, whereby the regulating device comprises an emission control loop, which is designed to control the charge-air pressure as a substitute variable for the NOx emission by the actuators influencing the charge-air pressure via a functional relationship, such that, for each target power or actual power of the internal combustion engine, a charge-air pressure target value can be set, and whereby the internal combustion engine further comprises a variable valve train, by means of which an operating characteristic of at least one inlet valve can be varied, whereby the functional relation- (Continued)

ship takes into account the influence of an adjustment of the operating characteristic of the at least one inlet valve.

16 Claims, 2 Drawing Sheets

(52) U.S. Cl.
CPC .... *F02D 41/0007* (2013.01); *F02D 2041/001* (2013.01); *F02D 2200/0411* (2013.01); *F02D 2250/36* (2013.01); *Y02T 10/12* (2013.01)

(58) Field of Classification Search
CPC ....... F02D 2200/0411; F02D 2041/001; F02D 2041/002; F02D 41/0027; F02D 19/022; Y02T 10/144; Y02T 10/47; Y02T 10/142; Y02T 10/32; F02B 63/04
See application file for complete search history.

(56) References Cited

U.S. PATENT DOCUMENTS

| | | | |
|---|---|---|---|
| 5,211,147 A | 5/1993 | Ward | |
| 5,265,564 A | 11/1993 | Dullaway | |
| 5,372,108 A | 12/1994 | Wu | |
| 5,588,411 A * | 12/1996 | Kreuter | F01L 1/352 123/339.14 |
| 6,125,801 A * | 10/2000 | Mendler | F01L 1/34 123/48 R |
| 6,219,611 B1 * | 4/2001 | Russell | F01L 1/34 123/399 |
| 6,365,118 B1 * | 4/2002 | Kharas | B01D 53/9418 423/213.2 |
| 7,281,531 B1 | 10/2007 | Fulton et al. | |
| 7,607,416 B2 | 10/2009 | Sato | |
| 7,778,766 B1 * | 8/2010 | Cowgill | F01L 1/344 123/568.14 |
| 7,954,465 B2 | 6/2011 | Huang | |
| 10,161,320 B2 * | 12/2018 | Kopecek | F02D 41/18 |
| 2003/0159441 A1 * | 8/2003 | Kim | F02B 37/18 60/608 |
| 2005/0098162 A1 | 5/2005 | Bryant | |
| 2006/0021606 A1 | 2/2006 | Bryant | |
| 2006/0060166 A1 | 3/2006 | Huang | |
| 2007/0137611 A1 * | 6/2007 | Yu | F02D 41/3047 123/304 |
| 2008/0021629 A1 * | 1/2008 | Russell | F02D 41/0002 701/101 |
| 2008/0283025 A1 | 11/2008 | Sato | |
| 2009/0018751 A1 | 1/2009 | Buckland et al. | |
| 2011/0155112 A1 * | 6/2011 | Schiestl | F02D 41/0007 123/672 |
| 2012/0067311 A1 | 3/2012 | Auffret et al. | |
| 2012/0090580 A1 | 4/2012 | Hu | |
| 2013/0333674 A1 * | 12/2013 | Brinkmann | F02B 33/00 123/563 |
| 2014/0144397 A1 | 5/2014 | Bromberg, III et al. | |
| 2015/0075492 A1 * | 3/2015 | Glugla | F02D 41/3094 123/349 |
| 2015/0167578 A1 | 6/2015 | Hotta | |
| 2015/0233312 A1 | 8/2015 | Kopecek et al. | |
| 2016/0025024 A1 | 1/2016 | Huber et al. | |
| 2017/0089271 A1 * | 3/2017 | Kleinhans | F02D 41/107 |

FOREIGN PATENT DOCUMENTS

| | | |
|---|---|---|
| CA | 2 881 529 A1 | 4/2015 |
| DE | 196 46 651 C1 | 4/1998 |
| EP | 0 259 382 B1 | 10/1989 |
| EP | 0 541 613 A1 | 5/1993 |
| EP | 636777 A2 | 2/1995 |
| EP | 476010 B1 | 8/1995 |
| EP | 1 561 931 A1 | 8/2005 |
| EP | 2 195 531 A1 | 6/2010 |
| EP | 2 438 284 A1 | 4/2012 |
| JP | H09-250352 A | 9/1997 |
| JP | 2003-041960 A | 2/2003 |
| JP | 2012-021434 A | 2/2012 |
| JP | 2014-098322 A | 5/2014 |
| WO | 92/002719 A1 | 2/1992 |
| WO | 2006/023375 A2 | 3/2006 |
| WO | 2006023375 A2 | 3/2006 |
| WO | 2009/017431 A1 | 2/2009 |
| WO | 2010/140020 A1 | 12/2010 |
| WO | 2013158374 A1 | 10/2013 |

OTHER PUBLICATIONS

Machine translation and International Preliminary Report on Patentability issued in connection with corresponding PCT Application No. PCT/AT2016/050236 dated Jan. 2, 2018.

* cited by examiner

INTERNAL COMBUSTION ENGINE WITH A REGULATING DEVICE

TECHNOLOGY FIELD

The present disclosure relates to an internal combustion engine with a regulating device.

BACKGROUND

An internal combustion engine is evident from EP 0 259 382 B1.

In the control strategy known from EP 0 259 382 B1, a charge-air pressure target value is generated as a function of a measured actual power of the internal combustion engine. By means of a first control loop (charge-air pressure regulator), the actual charge-air pressure is readjusted to the charge-air pressure target value via a target-actual value comparison. At this charge-air pressure target value, there is a certain target value of the NOx emission level. Since the NOx emission is not known directly, the charge-air pressure is used as an auxiliary control variable. The functional relationship takes the form of a set of curves, whereby each curve indicates the relationship between the actual power and the charge-air pressure target value for a specific NOx value. In this respect, the charge-air pressure regulator is thus actually an emission control loop with regard to the NOx emission (NOx emission control loop).

The lambda value is adjusted by influencing a gas metering device. The change in the lambda value in itself would cause a change in the power of the internal combustion engine, which must be compensated for by a second regulating circuit (power control loop). This compensation in the power control loop is performed via those actuators that influence the charge-air pressure directly (throttle valve and compressor bypass). The charge-air pressure is thus regulated indirectly via the lambda value. This control strategy is known as LEANOX® regulation.

Accordingly, the functional relationship between the relatively easily measurable charge-air pressure prevailing upstream of the inlet valves of the engine and the power is used to control the NOx emissions.

For this purpose, the output of the charge-air pressure measurement is connected to an actual value input of the first control loop. In the first control loop of EP 0 259 382 B1 (charge-air pressure regulator), a programmable device is arranged for determining a power-dependent target value of the charge-air pressure from the power measurement signal supplied by the power measurement device.

In this case, the charge-air pressure is regulated indirectly by regulating the combustion air ratio (lambda) in the air-gas mixer, whereby e.g. a leaning of the mixture (increasing the lambda) causes an increase in the charge-air pressure upstream of the inlet valves (in the demand for a constant engine power).

The above is a description of the cascaded form of the LEANOX® regulation. It is also possible to perform both regulating interventions simultaneously (see unpublished Austrian patent application A 575/2014). An embodiment of the invention can be used in both forms of the LEANOX® regulation.

An alternative is to use the cylinder pressure as a control variable instead of the charge-air pressure. This is described e.g. in the unpublished Austrian patent application A 120/2014. An embodiment of the invention can also be used with such a regulation.

In principle, two types of internal combustion engines are known with regard to the type of fuel injection into the piston-cylinder units.

The first type are air-charged internal combustion engines with cylinder-specific fuel supply (e.g. using port injection valves). The second type are mixture-charged internal combustion engines. An embodiment of the invention can be used in both types of internal combustion engines.

Further, a variable valve train is known, which allows a variable operating characteristic of the inlet valves.

It is also known that the intake valves of an internal combustion engine can be closed before the piston has reached its bottom dead center in the intake stroke (early Miller cycle). In an alternative cycle, the inlet valves are closed in the compression stroke after reaching the maximum filling in the cylinder (late Miller cycle).

An early Miller cycle with a modified operating characteristic of the inlet valves in the direction of a reduced degree of filling causes: in order to provide a constant power, the energy supplied to the combustion chamber must be kept approximately constant, owing to which the charge-air pressure must increase due to the expansion or the reduced effective compression, the temperature of the cylinder charge at the time of ignition decreases, resulting in lower NOx emissions The Miller cycle can be performed e.g. via a variable valve train.

If a variable valve train is used to increase the efficiency or for power regulation, and it intervenes on the operating characteristic of the inlet valves and thus changes the volumetric efficiency and the Miller effect, then the initially explained relationship between charge-air pressure, power and emissions no longer applies.

The problem is that the control methods known from the prior art for emission control do not consider the influence on the Miller cycle of the changed operating characteristic of the inlet valves of a variable valve train, resulting in an unfavorable emissions behavior.

BRIEF DESCRIPTION

The object of an embodiment of the invention is to provide an internal combustion engine with an improved regulating device in comparison with the prior art.

Thus, if the functional relationship considers the influence of an adjustment of the operating characteristic of the at least one inlet valve, then the most favorable regulating intervention in terms of emissions and efficiency can be performed in the regulation of the internal combustion engine.

An adjustment of the operating characteristic of the at least one inlet valve is performed e.g. by a variable valve train (VVT).

A variable valve train is often used because it allows an internal combustion engine to be operated at different operating points with the most favorable efficiency. It is also known that a variable valve train can be used for power regulation, such as to perform throttle valve-free operation.

A change in the operating characteristic of an inlet valve causes a change in the volumetric efficiency (degree of filling) and thus the mass flow rate of the internal combustion engine.

A power control loop is designed to match an actual power of the internal combustion engine with a target power of the internal combustion engine.

Assuming constant power and constant NOx emissions, the charge-air pressure must be increased for an operating characteristic with a lower degree of filling, but not so much as to set the same fuel-air ratio, since there is stronger cooling of the cylinder charge.

EXAMPLE

If we transition from a first control time to a control time with "sharper" inlet valve closing times, firstly the mechanical or electrical power of the internal combustion engine decreases. "Sharper" inlet valve closing times mean the change in the inlet valve closing times in the Miller cycle which causes a lower degree of filling of the internal combustion engine. This can be performed by an earlier inlet valve closure or a later inlet valve closure, depending on the current speed of the internal combustion engine and the current closing time of the inlet valves.

The filling of the cylinder (degree of filling, volumetric efficiency) describes the ratio of the fresh charge actually contained in the cylinder to the theoretically maximum possible filling after completing a charge change.

The power control loop of the internal combustion engine will initially increase the charge-air pressure quickly to restore performance. However, the emission control loop would be enriched as it attempts to provide the power at the same charge-air pressure. The stored functional relationship comes into play here: Adapted to the changed closing time, a new target charge-air pressure is specified for the power to be provided. The intervention of the emission control loop is thereby limited to the fuel-air ratio such that the enrichment is limited to the correct level for the performance to be provided. The charge-air pressure increased in the first reaction of the power control loop can then be reduced again.

The example described so far referred to a cascaded regulator in a mixture-charged internal combustion engine.

The cascaded control concept can also be used with a cylinder-specific fuel injection.

The parallel control method will be described below using the example of a cylinder-specific fuel injection. However, it can also be used with mixture-charged internal combustion engines:

If the degree of filling decreases due to the action of the at least one inlet valve on the operating characteristic and thus—with a constant amount of gas—the amount of air decreases, the fuel-air mixture in the combustion chamber becomes too rich.

By adapting the functional relationship to the changed operating characteristic of the at least one inlet valve, the charge-air pressure is increased.

As a result, a mixture which is richer than the previous operating point is obtained which, despite the changed Miller effect, enables constant NOx emissions.

According to an embodiment of the invention, the functional relationship, which e.g. is in the form of a curve, whereby the curve for a specific NOx emission value indicates the relationship between the actual power and the charge-air pressure target value, is modified compared to the prior art such that the influence of the Miller cycle is taken into account for every opening characteristic of the variable valve train and the internal combustion engine provides the power at the correct NOx emission values. In other words, a different target curve in the power/charge-air pressure characteristic map is selected, i.e. an operating point adapted to the changed opening characteristic of the inlet valves is selected.

BRIEF DESCRIPTION OF THE DRAWINGS

The invention is explained in more detail below with reference to the figures. The drawings in detail.

DETAILED DESCRIPTION

Figure 1:
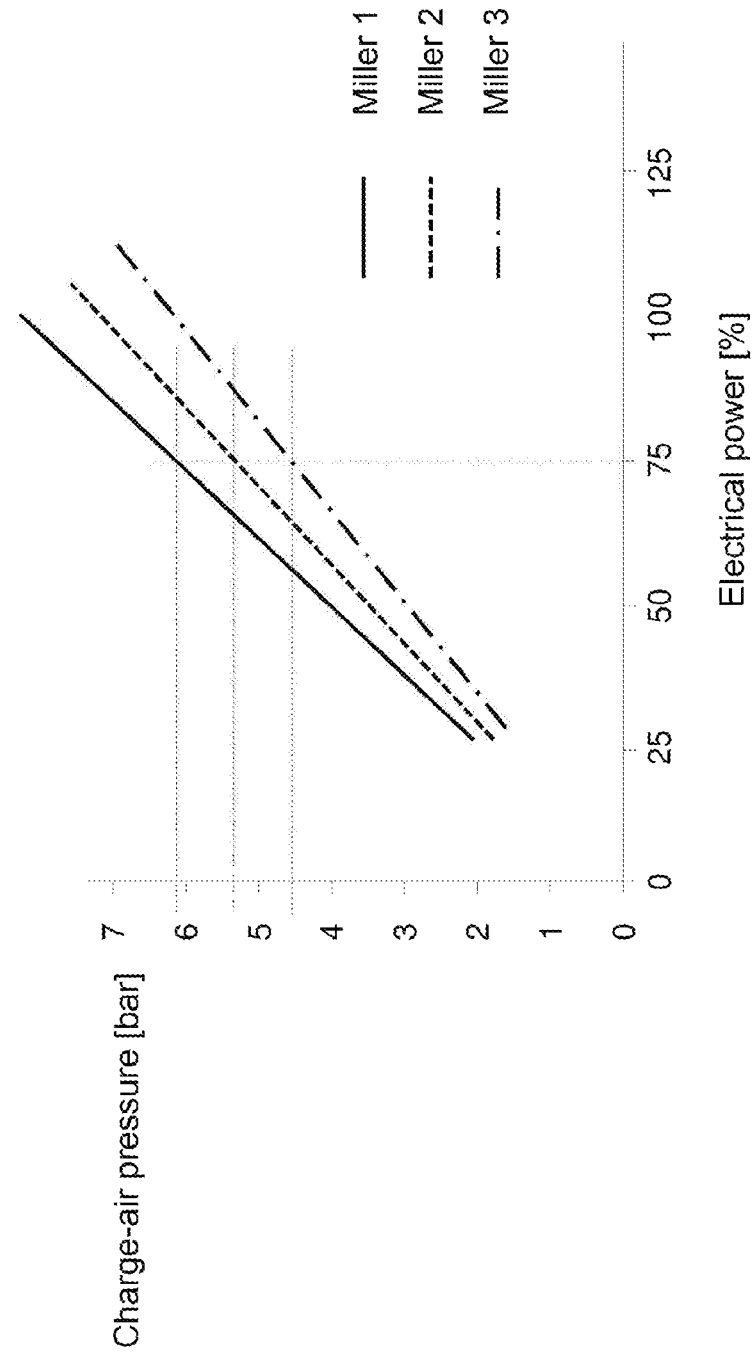
FIG. 1 a diagram of charge-air pressure versus power for various Miller control times and FIG. 2 a schematic representation of an internal combustion engine.

FIG. 1 shows a diagram of the charge-air pressure of an internal combustion engine over the mechanical or electrical power delivered by the internal combustion engine. The relationship is plotted for three different control times (the curves Miller 1, Miller 2 and Miller 3) for specific NOx emissions which are the same for all three curves.

Here, the inlet valve closure is the earliest in "Miller 1", latest in "Miller 3", and intermediate in "Miller 2". The control time of the course marked "Miller 1" corresponds—in the words of the previous description—to a "sharper" valve closing time. Via the earlier inlet valve closure in "Miller 1" compared to the two other control times, in order to achieve constant NOx emissions to obtain the same mechanical or electrical power (e.g. 75%) in Miller 1, a higher charge-air pressure is required than e.g. in Miller 2 or Miller 3.

During the operation of an internal combustion engine 1 equipped with a variable valve train 3, the control times of the inlet valves 4 are changed many times. This allows a reaction to changing load requirements as well as to changing environmental conditions. As an example, we can mention the starting process, during which the closing times of the inlet valves 4 are usually made less sharp compared to the closing times for full-load operation. Another changing condition is the external temperature. Wear and deposits on the gas exchange unit also require adjustments to the control times.

If the regulation of the internal combustion engine now moves from a constant relationship stored for an operating characteristic of the inlet valves 4 between charge-air pressure and power according to the prior art, then errors occur in the target charge-air pressure determined from the relationship, as soon as the operating characteristic has changed compared to the initial value.

With an embodiment of the present invention, the influence of an adjustment of the operating characteristic of the at least one inlet valve 4 is taken into account in the regulating device C of the internal combustion engine 1.

Figure 2:
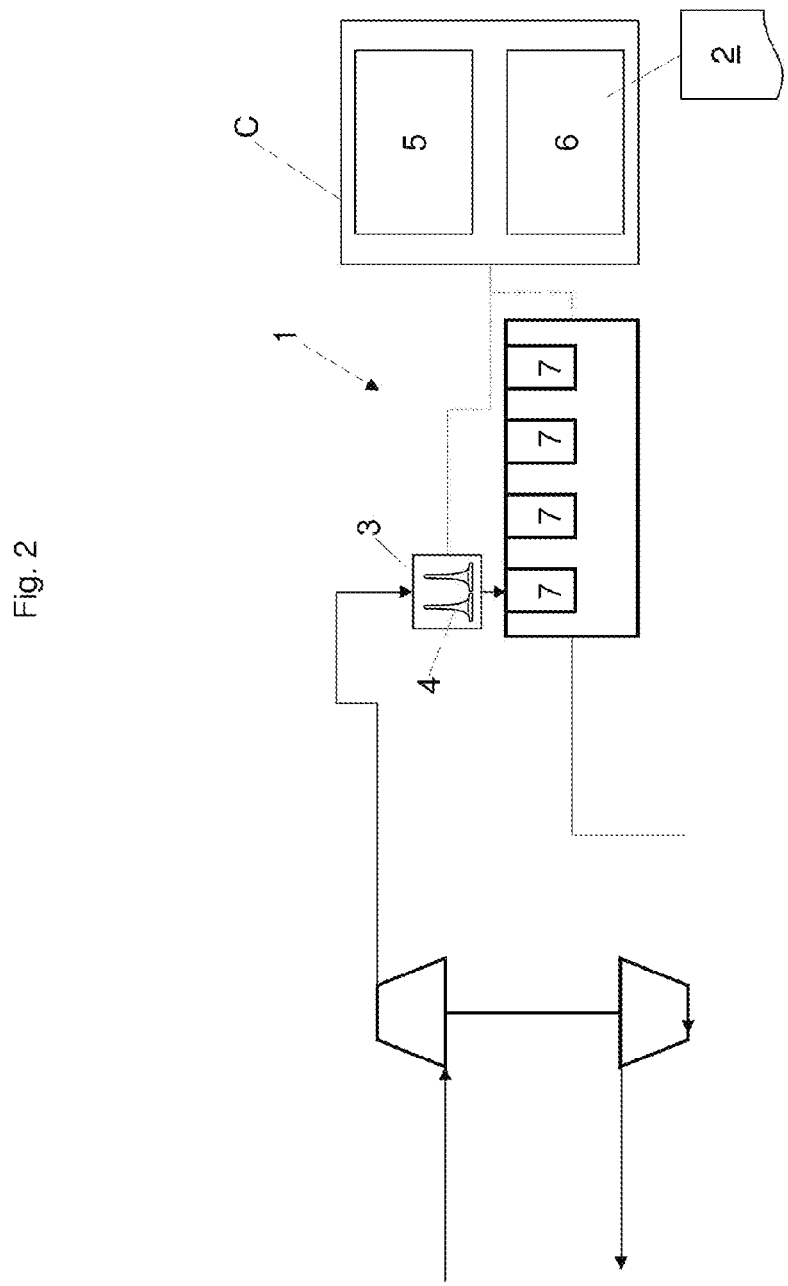

FIG. 2 shows schematically an internal combustion engine 1 which is equipped with a variable valve train 3. With the variable valve train 3, the opening characteristic of the at least one inlet valve 4 and thereby the quantity (volume) of the charge air or propellant gas-air mixture flowing into a combustion chamber 7 of the internal combustion engine 1 can be varied in individual cycles and optionally in individual cylinders. In this example, four combustion chambers 7 are shown. There can be significantly more or fewer.

The regulating device C includes a power control loop 5 designed to match an actual power of the internal combustion engine 1 with a target power of the internal combustion engine 1, and an emission control loop 6 designed to control, via a functional relationship 2, the charge-air pressure as a substitute variable for the NOx emission by the actuators influencing the charge-air pressure, such that, for each target power $P^d_g$ or actual power $P_g$ of the internal combustion engine 1, a charge-air pressure target value $p^d_{im}$ can be set. The functional relationship 2 can e.g. be stored in the form of a family of curves, a characteristic map, a table or in the form of an analytical relationship.

The invention claimed is:

1. A system, comprising:
an engine controller, wherein the engine controller is configured to:
adjust an operating characteristic of at least one intake valve of a variable valve train of an internal combustion engine;
determine a target charge air pressure of the internal combustion engine based on a value of the operating characteristic of the at least one intake valve, a target value of nitrogen oxide (NOx) emissions, and a power of the internal combustion engine utilizing a functional relationship between the target charge air pressure and the power of the internal combustion engine for the target value of the NOx emissions, wherein the functional relationship is determined based on the value of the operating characteristic of the at least one intake valve; and
adjust a charge air pressure of the internal combustion engine based on the target charge air pressure.

2. The system of claim 1, wherein the engine controller comprises a plurality of curves for the target value of the NOx emissions, each curve of the plurality of curves represents a relationship between the target charge air pressure and the power of the internal combustion engine for a different value of the operating characteristic of the at least one intake valve, and the engine controller is configured to determine the functional relationship by selecting one curve of the plurality of curves based on the value of the operating characteristic of the at least one intake valve.

3. The system of claim 1, wherein the operating characteristic comprises a closing time of the at least one intake valve.

4. The system of claim 3, wherein the closing time of the at least one intake valve is adjusted for a start up condition.

5. The system of claim 3, wherein the closing time of the at least one intake valve is adjusted for a full load condition.

6. The system of claim 1, comprising the internal combustion engine having the engine controller.

7. An internal combustion engine, comprising:
a variable valve train comprising:
at least one intake valve; and
a controller communicatively coupled to the variable valve train, wherein the controller is configured to:
adjust an operating characteristic of the at least one intake valve of the variable valve train of the internal combustion engine;
determine a target charge air pressure of the internal combustion engine based on a value of the operating characteristic of the at least one intake valve, a target value of nitrogen oxide (NOx) emissions, and a power of the internal combustion engine utilizing a functional relationship between the target charge air pressure and the power of the internal combustion engine for the target value of the NOx emissions, wherein the functional relationship is determined based on the value of the operating characteristic of the at least one intake valve; and
adjust a charge air pressure of the internal combustion engine based on the target charge air pressure.

8. The internal combustion engine of claim 7, wherein the controller comprises a plurality of curves for the target value of the NOx emissions, each curve of the plurality of curves represents a relationship between the target charge air pressure and the power of the internal combustion engine for a different value of the operating characteristic of the at least one intake valve, and the controller is configured to determine the functional relationship by selecting one curve of the plurality of curves based on the value of the operating characteristic of the at least one intake valve.

9. The internal combustion engine of claim 7, wherein the operating characteristic comprises a closing time of the at least one intake valve.

10. The internal combustion engine of claim 9, wherein the closing time of the at least one intake valve is adjusted for a start up condition.

11. The internal combustion engine of claim 9, wherein the closing time of the at least one intake valve is adjusted for a full load condition.

12. A method, comprising:
adjusting an operating characteristic of at least one intake valve of a variable valve train of an internal combustion engine;
determining a target charge air pressure of the internal combustion engine based on a value of the operating characteristic of the at least one intake valve, a target value of nitrogen oxide (NOx) emissions, and a power of the internal combustion engine utilizing a functional relationship between the target charge air pressure and the power of the internal combustion engine for the target value of the NOx emissions, wherein the functional relationship is determined based on the value of the operating characteristic of the at least one intake valve; and
adjusting a charge air pressure of the internal combustion engine based on the target charge air pressure.

13. The method of claim 12, wherein adjusting the operating characteristic of the at least one intake valve comprises adjusting a closing time of the at least one intake valve.

14. The method of claim 13, wherein adjusting the closing time of the at least one intake valve comprises adjusting the closing time of the at least one intake valve based on a start up condition.

15. The method of claim 13, wherein adjusting the closing time of the at least one intake valve comprises adjusting the closing time of the at least one intake valve based a full load condition.

16. The method of claim 12, wherein determining the target charge air pressure of the internal combustion engine comprises utilizing a plurality of curves for the target value of the NOx emissions, wherein each curve of the plurality of curves represents a relationship between the target charge air pressure and the power of the internal combustion engine for a different value of the operating characteristic of the at least one intake valve, and wherein the functional relationship is determined by selecting one curve of the plurality of curves based on the value of the operating characteristic of the at least one intake valve.

* * * * *